United States Patent [19]

Sexton et al.

[11] Patent Number: 4,854,923

[45] Date of Patent: Aug. 8, 1989

[54] TORQUE TRANSMISSION UNIT FOR PARTIALLY FROZEN BEVERAGE SYSTEM

[75] Inventors: Rodney N. Sexton, Laguna Hills; Floyd S. Woolf, Lake Matthews, both of Calif.

[73] Assignee: ICEE-USA Corporation, Anaheim, Calif.

[21] Appl. No.: 245,010

[22] Filed: Sep. 15, 1988

[51] Int. Cl.[4] ............................................. F16H 7/00
[52] U.S. Cl. ........................................ 474/84; 74/356; 192/108; 464/39
[58] Field of Search ..................... 474/84–89, 474/67–70; 192/108; 464/39, 38, 37; 62/70, 136; 74/356, 359

[56] References Cited

U.S. PATENT DOCUMENTS

| | | | |
|---|---|---|---|
| 1,163,085 | 12/1915 | Hardy | 192/108 |
| 1,352,293 | 9/1920 | Lovell | 192/108 X |
| 1,386,139 | 8/1921 | Stockdale et al. | 192/108 X |
| 2,162,624 | 6/1939 | Logue | 474/87 |
| 2,174,342 | 9/1939 | Greulich | 464/39 |
| 2,291,407 | 7/1942 | Paul | 464/39 |
| 2,597,140 | 5/1952 | Versnel | 192/150 |
| 3,108,449 | 10/1963 | Lents | 62/70 |
| 3,403,524 | 10/1968 | Mitchell et al. | 62/70 |
| 3,470,706 | 10/1969 | Mitchell et al. | 62/179 |
| 3,507,475 | 4/1970 | Davis et al. | 251/120 |
| 3,510,617 | 5/1970 | Mitchell et al. | 200/83 |
| 3,529,748 | 9/1970 | Mitchell et al. | 222/54 |
| 3,545,063 | 12/1970 | Mitchell | 29/157 |
| 3,591,051 | 7/1971 | Mitchell | 222/56 |
| 3,605,977 | 9/1971 | Janz et al. | 474/86 X |
| 3,823,571 | 7/1974 | Smith et al. | 62/136 |
| 4,090,348 | 5/1978 | De Vittorio | 474/86 X |
| 4,093,055 | 6/1978 | Blackburn et al. | 464/39 X |

OTHER PUBLICATIONS

"ICEE Dispenser" Service Manual/Parts Catalog. ID 789284., Div. John E. Mitchell Co., pp. 2, 17, 48, 49 (Jul. 1975).

"ICEEQUIP" Equipment and Service Manual, Div. John E. Mitchell Co. (Mar. 1978).

Primary Examiner—Thuy M. Bui
Attorney, Agent, or Firm—Steele, Gould & Fried

[57] ABSTRACT

A pair of torque transmission units deliver torque to first and second cooling chambers that produce the partially frozen beverages. A first torque transmission unit is directly coupled to a geared motor. The first unit includes a stand with three upright members that rotatably support first and second axially aligned shafts. The first shaft is connected to the output of the geared motor. Axially separable sections of a coupler are attached to opposing ends of the shafts. The first shaft is rotatably mounted in a first upright member; the second shaft is rotatably mounted in second and third upright members. A drive wheel is attached to the first shaft. An output wheel is attached to the second shaft. The second torque transmission unit includes a stand having four uprights which rotatably support first and second axially aligned shafts. An input wheel is mounted on the first shaft. A coupler having axially separable sections is mounted intermediate the second and third uprights and each axially separable section is respectively attached to the first and second shafts. An output wheel is attached to the second shaft. A thrust bearing is attached to the first shaft intermediate the input wheel and the first upright member. The torque transmission system includes a belt for conveying torque between the drive wheel and the input wheel. The system also includes further belts respectively connecting the output wheels to the respective ones of the cooling chambers.

20 Claims, 5 Drawing Sheets

TORQUE TRANSMISSION UNIT FOR PARTIALLY FROZEN BEVERAGE SYSTEM

BACKGROUND OF THE INVENTION

The present invention relates to torque transmission units which convey torque from a motor to rotating paddles in cooling chambers that produce partially frozen beverages.

A partially frozen beverage is produced by continually agitating and cooling a carbonated beverage contained within a cooling chamber. The beverage is continuously agitated by rotating paddles in order to keep the beverage in a partially frozen, semi-solid, semi-liquid state.

In order to achieve and maintain the consistency of the partially frozen beverage, the flow of refrigeration coolant to and from the cooling chamber is regulated by a feedback control mechanism. One type of feedback control mechanism senses the counter torque exerted on the paddles by the partially frozen beverage in the canister. As used herein, rotational movement and torque is delivered to the paddles by a motor and various drive and transmission mechanisms in one direction. The beverage resists this motion and exerts a counter torque on the paddles. This counter torque increases as the beverage freezes. The counter torque is conveyed through the drive mechanism back to the motor. U.S. Pat. No. 4,093,055 to Blackburn et al. describes a torque transmitting, torque sensing system. The description of the system in Blackburn et al. is incorporated herein by reference thereto.

Blackburn et al. disclose a motor coupled by a pair of belts to first and second torque transmitting units. In one embodiment, the torque transmitting units each have an axially separable coupling unit. The torque is transmitted from the motor, through the belts, to each torque transmitting unit. Each unit has an output pulley wheel that drives another belt extending around a pulley wheel attached to the shaft upon which the paddles are mounted. As the counter torque developed by the partially frozen beverage increases, the axially separable coupling members separate. Blackburn et al. disclose a switch that monitors the axial separation of the coupling members. The switch is activated when the coupling members are separated a predetermined distance. A control mechanism is then activated and the flow of refrigeration coolant to the cooling chamber is stopped. Since the partially frozen beverage is no longer being chilled, the beverage does not solidify further and the appropriate consistency of the beverage is achieved. By sensing further changes in the counter torque of the drive system, a feedback control system is established that controls the flow of coolant to the chamber and hence the consistency of the beverage. U.S. Pat. No. 3,108,449 to Lents describes such a partially frozen beverage system. U.S. Pat. No. 3,823,571 to Smith et al. also discloses a partially frozen beverage system. The disclosures in Lents and Smith et al. are incorporated herein by reference thereto.

OBJECTS OF THE INVENTION

It is an object of the present invention to provide a torque transmission unit that has a greater stability and a higher sensitivity to changes in the counter torque than the prior art devices.

It is another object of the present invention to provide a pair torque transmission units that are easier to align with respect to each other than the prior art devices.

It is a further object of the present invention to provide torque transmission units that are easier to align with respect to the cooling chambers than the prior art devices.

It is an object of the present invention to provide a torque transmission unit that imparts significantly less axial stress on the cooling chamber shaft than the prior art devices.

It is an additional object of the present invention to provide a torque transmission unit on an independent stand which provides better support for the axially separable couplings.

It is a further object of the present invention to provide torque transmission units that enable better control of the tensioning of the belts extending between the two units and extending between each unit and the cooling chambers than the prior art devices.

SUMMARY OF THE INVENTION

A pair of torque transmission units deliver torque to first and second cooling chambers that produce the partially frozen beverages. A first torque transmission unit is directly coupled to a geared motor. The first unit includes a stand with three upright members that rotatably support first and second axially aligned shafts. The first shaft is connected to the output of the geared motor. Axially separable sections of a coupler are attached to opposing ends of the first and second shafts. The first shaft is rotatably mounted in a first upright member; the second shaft is rotatably mounted in second and third upright members over a region remote from the coupler. A drive wheel is attached to the first shaft at a position remote from the coupler. An output wheel is attached to the second shaft at a position intermediate the second and third uprights. The second torque transmission unit includes a stand having four uprights which rotatably support first and second axially aligned shafts. An input wheel is mounted on the first shaft intermediate the first and second uprights. A coupler having axially separable sections is mounted intermediate the second and third uprights and each axially separable section is attached to an opposing end of the first and second shafts. An output wheel is attached to the second shaft intermediate the third and fourth uprights. A thrust bearing is mounted to the first shaft intermediate the input wheel and an inboard side of the first upright member. The torque transmission system includes a belt for conveying torque between the drive wheel of the first unit to the input wheel of the second unit. The system also includes further belts respectively connecting the output wheels of the first and second transmission units to the respective ones of the cooling chambers.

BRIEF DESCRIPTION OF THE DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to a system for delivering torque to a mechanism which produces a partially frozen beverage.

Figure 1:
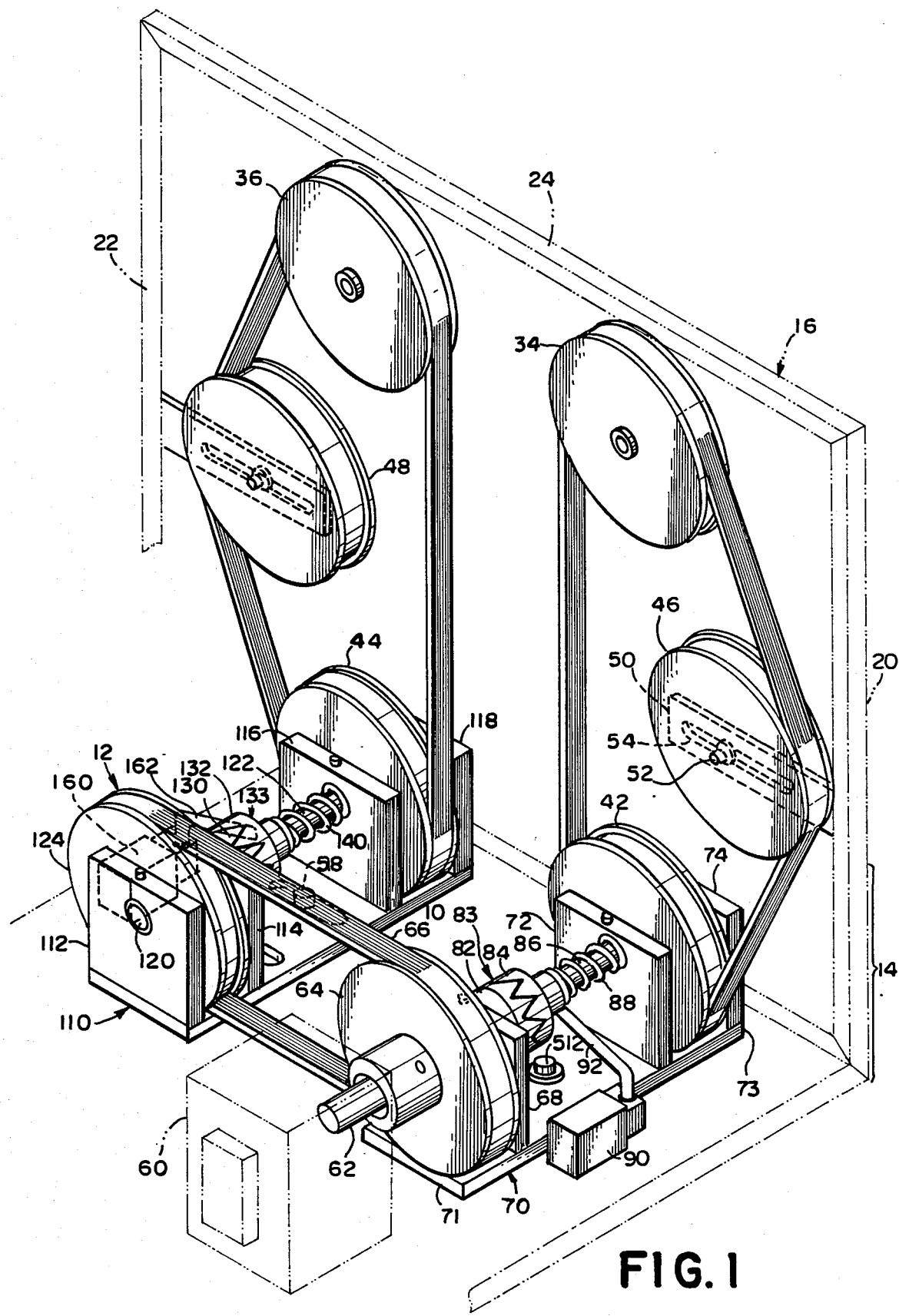
FIG. 1 illustrates a schematic, perspective view of a pair of torque transmission units that drive wheels attached to the shafts which extend through respective cooling chambers.

FIG. 1 illustrates, in schematic form, a perspective view of first and second torque transmission units 10, 12 mounted in a lower region 14 of housing 16. Housing 16 includes a floor 18, rear housing support structures 20,22 and an upper housing section 24. Torque units 10,12 are mounted on floor 18.

Figure 2:
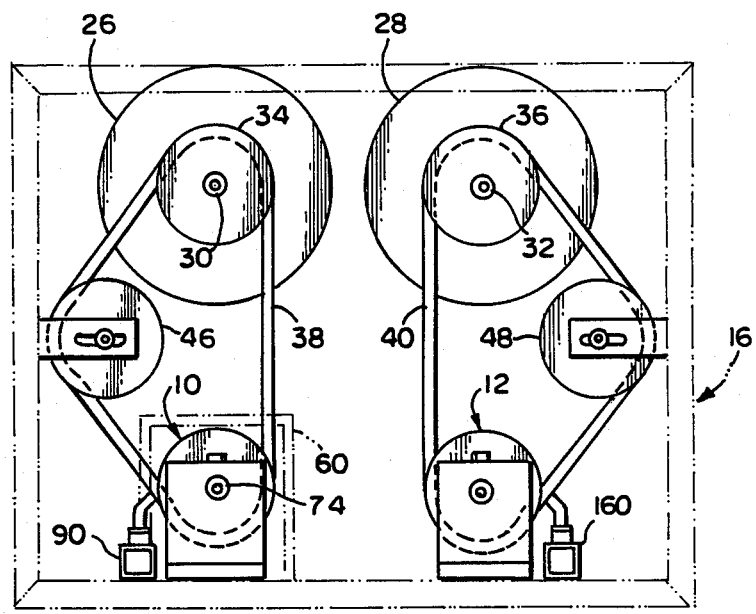
FIG. 2 is a schematic, rear view of the partially frozen beverage system showing the transmission units and cooling chambers.

FIG. 2 schematically illustrates a rear view of torque transmission units 10, 12 mounted immediately below cooling chambers 26, 28. Each cooling chamber has a shaft 30, 32 extending into the interior thereof which holds paddles to agitate the partially frozen beverage. Shafts 30, 32 are rotated via chamber drive wheels 34, 36.

Returning to FIG. 1, chamber drive wheels 34, 36 are coupled via drive belts 38, 40 to output wheels 42, 44, respectively incorporated within torque transmission units 10, 12. The tension on belts 38, 40 is controlled by idler wheels 46, 48. The idler wheels are rotatably mounted onto housing 16. Specifically, idler wheel 46 is rotatably mounted on horizontal support bar 50 via mounting means 52. Horizontal support 50 includes a slot 54 in which mounting means 52 slides, thereby enabling the tension on belt 38 to be changed.

Torque transmission units 10, 12 are supplied with torque from a motor and gear box 60. The output shaft 62 of gear box 60 is connected to a first shaft (not shown) of torque transmission unit 10.

A drive wheel 64 is attached to the first shaft of unit 10. Drive wheel 64 imparts torque to transmission unit 12 via belt 66. The first shaft is supported on the front by gear box 60 and on the rear end by upright 68 of stand 70. Herein, the front end of items are ends remote from rear support 20 of housing 16. Therefore, edge 71 of stand 70 is the front edge of the stand whereas edge 73 is the rear edge of the stand. A coupler section 82 is attached at the rear end of the first shaft. Coupler section 82 interfits and meshes with another coupler section 84. Coupler section 84 is attached to shaft 86 that is the second, axially aligned shaft of the unit. Coupler sections 82 and 84 are collectively referred to as coupler 83. Coupler sections 82 and 84 are axially separable therefore the ends of shafts 62 and 86 are spaced apart. Generally, coupler section 84 is biased inboard towards coupler section 82 via biasing means or spring 88. In general, spring 88 abuts second upright 72 of stand 70. Upright 72 and a third upright 74 of stand 70 rotatably support second shaft 86. Output wheel 42 is mounted onto shaft 86 intermediate uprights 72, 74.

The axial positioning of coupler section 84 vis. a vis. coupler section 82 is sensed by a switch 90. Switch 90 has an arm 92 that rests against the rear face of coupler section 84. Further details of torque transmission unit 10 are discussed below with respect to FIG. 3.

Torque transmission unit 12 includes a stand 110 that rotatably holds a first shaft 120 and a second shaft 122. Shaft 120 is rotatably held by uprights 112 and 114; shaft 122 is rotatably held by uprights 116 and 118. Mounted onto shaft 120 intermediate uprights 112 and 114 is an input wheel 124. Input wheel 124 is driven via belt 66 by drive wheel 64. The inboard end of shaft 120 is connected to coupler section 130. The term "inboard" refers to items that are closer to the center of the units as compared with referenced items. For example, the outboard end of shaft 120 is proximate upright 112 whereas the inboard end of shaft 120 is proximate coupler section 130. Coupler section 130 interfaces with coupler section 132 (both collectively identified as coupler 133) which in turn is attached to the inboard end of shaft 122. Coupler section 132 is biased toward coupler section 130 by a spring 140 generally abutting upright 116. Output wheel 44 is mounted to shaft 122 intermediate uprights 116 and 118. Torque transmission unit 12 also includes a switch 160 having a switch arm 162 adapted to sense the axial separation of coupling sections 130 and 132.

FIG. 2 shows that the shafts in each torque transmission unit are vertically aligned and coplanar with the shafts extending through the cooling chambers. Accordingly, shaft 74 of torque unit 10 is vertically aligned and in the same plane as shaft 30 of cooling chamber 26. Idler wheel 46 is adjustable on horizontal support arm 50 such that the tension on belt 38 is easily controlled. The ability of the torque transmission unit to be coplanar with the cooling chambers and the adjustability of the idler arms enables the present invention to better control the tension on the drive belts 38, 40 and produces a torque transmission system that has a higher degree of sensitivity to changes in the torque than the prior art devices. The stability of the present system is also enhanced by this design and configuration.

Figure 3:
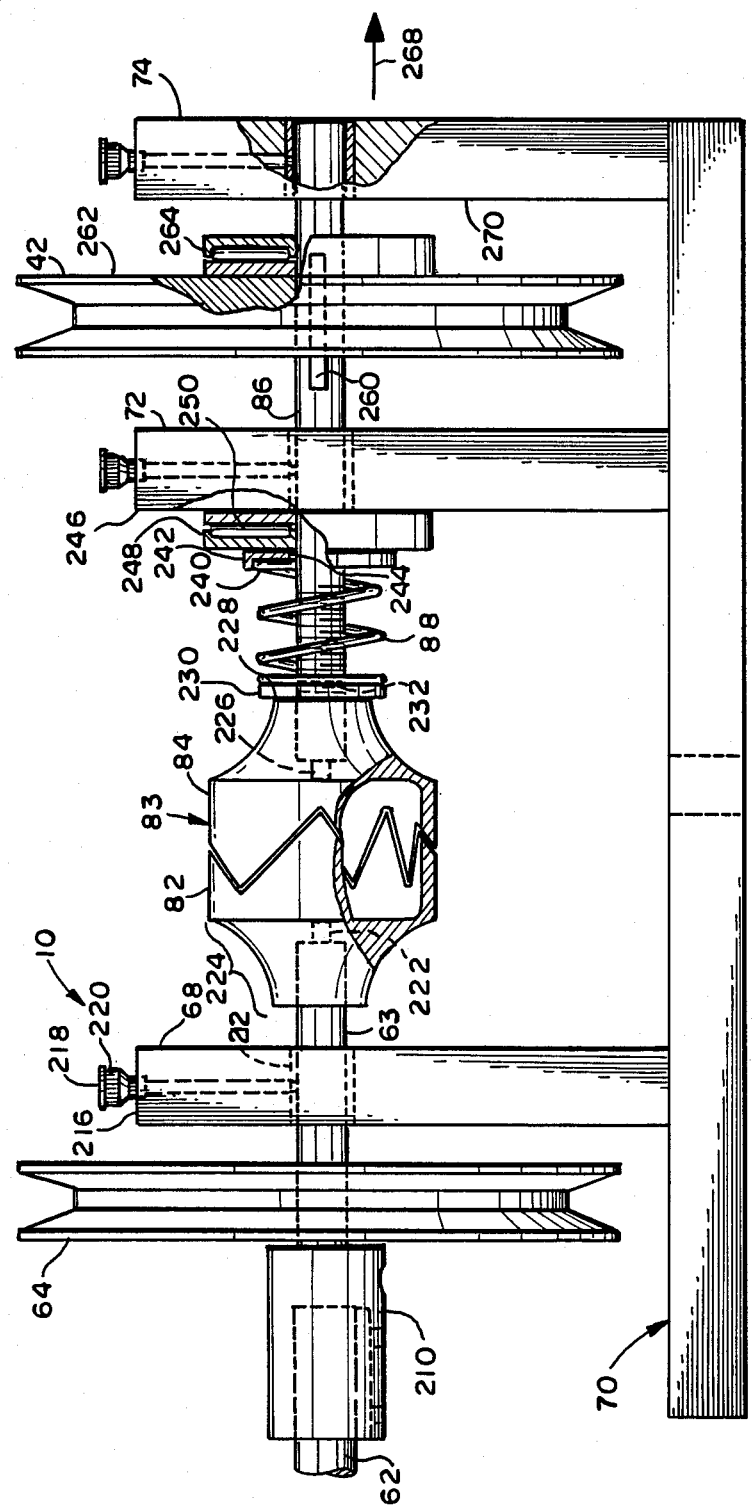
FIG. 3 is a side view of the first torque transmission unit.

FIG. 3 illustrates a side view of torque transmission unit 10. Shaft 62 is mounted in connector 210. Connector 210 is attached to the front end of shaft 63, that is, the first shaft of torque transmission unit 10. Upright 68 includes a brass bushing 212 through which extends shaft 63. A lubrication channel 214 extends from top surface 216 of upright 68 through the upright and brass bushing 212 such that the rotating shaft can be lubricated in the bushing. A cap 218 closes the lubrication channel. Cap 218 is maintained in the closed position via spring 220. All the transmission unit shafts are retained in similar brass bushings to reduce friction and enhance the units, sensitivity to changes in torque. The inboard end 222 of shaft 63 is keyed into coupling section 82. The front region 224 of coupling section 82 is solid. Preferably, the coupling sections are made of plastic.

Inboard end 226 of shaft 86 is keyed into the rear section of coupling section 84. A nut 230 abuts rear face 228 of coupling section 84. Nut 230 is threaded onto shaft 86 along threaded section 232. The axial positioning of the nut establishes the tension on biasing spring 88. At the outboard end 240 of spring 88 is a retaining washer 242. Washer 242 is spaced away from shaft 86 since through passage 244 is larger than the outside diameter of shaft 86. Interposed between inboard side 246 of upright 72 and washer 242 is a thrust bearing 248. The thrust bearing has needle bearings therein, one of which is needle roller 250, such that coupling 83 and shaft 86 can rotate freely while coupling section 84 is biased against coupling section 82 due to spring 88 generally abutting upright 72. Thrust bearing 248 is also spaced away from shaft 86 such that the inside diameter of the bearing does not adversely affect the rotation of the shaft. Upright 72 retains shaft 86 in a brass bushing 250. That upright also includes a lubrication channel and a lubrication cap as described in detail with respect to upright 68.

Figure 8:
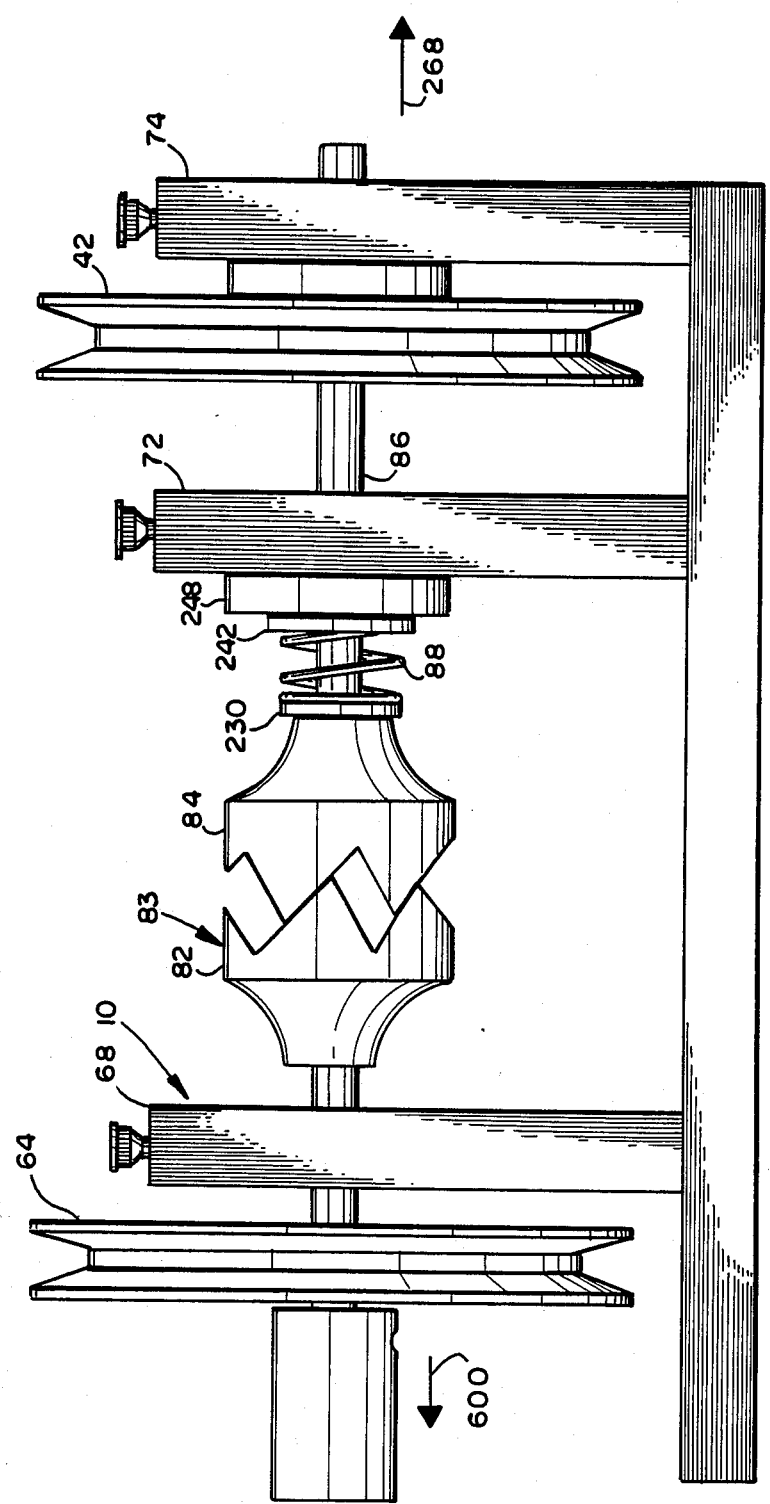
FIG. 8 illustrates a side view of the first torque transmission unit with the axially separable coupler being partly separated.

Output wheel 42 is mounted intermediate uprights 72 and 74. Wheel 42 is keyed onto shaft 86 by flattened land 260. A thrust second bearing 264 is disposed on the outboard side 262 of output wheel 42. The inboard side of thrust bearing 264 is mounted to or placed adjacent to output wheel 42. In operation, shaft 86 axially moves in the direction of arrow 268 dependent upon increasing the degrees of counter torque generated by the paddles in the cooling chambers. In a preferred embodiment, shaft 86 and output wheel 42 will move approximately 7/16". When the output wheel and thrust bearing reach the inboard surface 270 of upright 74, that surface provides a stop against which the output wheel and the thrust bearing bear in the fully axially extended position of coupling 83. See. FIG. 8.

Figure 5:
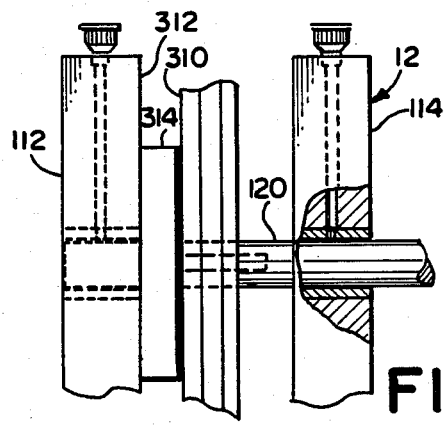
FIG. 5 is a partial side view of the front section of the second torque transmission unit, the unit not directly connected to the geared motor.

FIG. 5 shows a partial side view of torque transmission unit 12 and particularly the front end thereof with uprights 112 and 114. Input wheel 124 is attached to shaft 120 A thrust bearing 314 is intermediate the outboard side 310 of input wheel 124 and the inboard side 312 of upright 112. Thrust bearing 314 and the adjacent upright provide a rotatable stop for shaft 120. The balance of torque transmission 12 is substantially similar to torque transmission unit 10 described above.

In operation, drive wheel 64 of torque transmission unit 10 is maintained in an axially fixed position via shaft 62 of gear box 60. See FIG. 1. Input wheel 124 of torque transmission unit 12 is maintained in lateral alignment with drive wheel 64 due to thrust bearing 114 acting against upright 112. This support provided the gear box shaft 62 and upright 112 is required due to the axial forces generated by couplings 83 and 133, respectively associated with torque units 10 and 12. This axial support of the shafts enables the torque transmitting units to be laterally aligned with each other and enables drive wheel 64 and input wheel 124 to be laterally aligned. This support increases the sensitivity of apparatus to detect changes in the torque. Stability of the units is also enhanced.

Figure 4:
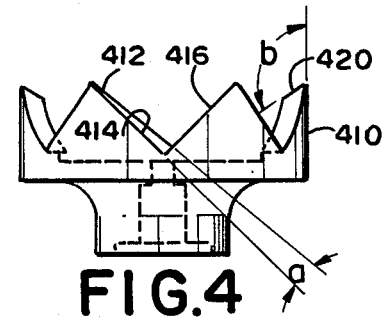
FIG. 4 is a view of one coupling section.

FIG. 4 illustrates a coupling section 410. This section has a plurality of teeth, one of which is tooth 412. The angle between tooth surface 414 and tooth surface 416 is greater than 90° by a small angular amount that is shown as angle "a" in FIG. 4. The top surface 420 of each tooth is angled b° and that angle is also greater than 90°.

Figure 7:
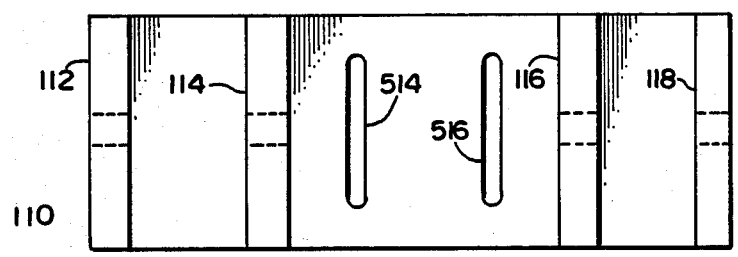
FIGS. 6 and 7, respectively, are schematic top views of the stands for the first and second torque transmission units.
Figure 6:
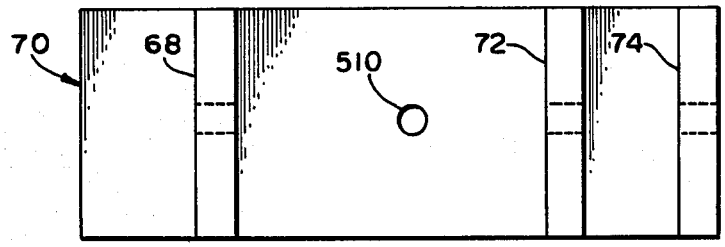

FIGS. 6 and 7, respectively, schematically illustrate the top views of stands 70 and 110 for the first and second torque transmission units. Stand 70 includes a single bolt hole 510 into which a bolt 512 shown in FIG. 1 extends. Any type of mounting means could be used in place of the bolt as long as the stand rotates accordingly. This single bolt enables stand 70 to be rotated about bolt 512 thereby enabling coplanar alignment with the shaft through the cooling chamber. Stand 110 includes laterally extending slots 514 and 516 through which extend mounting bolts. Bolt 518 is shown in FIG. 1 extending through one of the slots. In practice, stand 70 is first aligned with stand 110 loosely attached to floor 18 of housing 16. Then stand 110 is adjusted such that the tension on belt 66 is correctly set. These features enable the torque transmission units to be easily laterally aligned with each other.

FIG. 8 shows torque transmission unit 10 in an operational condition when coupling sections 82 and 84 are axially separated to the maximum position. This separation is established by the mounting position of output wheel 42 on shaft 86. This position is set during the installation of the unit. As shown, thrust bearing 264 is adjacent upright 74 thereby prohibiting further axial movement of shaft 86 in an outboard direction or in the direction of arrow 268. Coil spring 88 is compressed to a high degree. At this position, switch 90 would be activated (see FIG. 1) and the refrigeration coolant supplied to the cooling chamber would be stopped. Thereafter, the counter torque developed by the partially frozen beverage in the cooling chamber would decrease, since the temperature of the beverage would increase, and hence coil spring 88 would force coupling section 84 to further mate and interfit with coupling section 83. In the illustrated position, there is a high degree of axial force in the direction of arrow 600 acting on the output shaft of gear box 60. In prior art embodiments, the first shafts of each torque transmission unit would be directly connected to the shafts extending through the cooling chambers. This direct connection to the cooling chamber shaft sometimes caused the rear seal bearing to wear excessively and affected the other components in the cooling chamber. The present system eliminates this axially directed force by enabling the gear box to restrain that force without detriment to the cooling chamber. With respect to the second torque transmission unit, upright 112 provides the biasing stop for this axial force.

The claims appended hereto are meant to cover modifications and changes within the scope and spirit of the present invention. For example, the thrust bearings could be replaced by roller bearings. Different types of biasing mechanisms could replace spring coil 88 and 140. The belts could be replaced by many drive mechanisms including chains, direct drives, etc. These and other changes are meant to be encompassed by the appended claims.

What is claimed is:

1. A system for delivering torque to a first and a second means for producing partially frozen beverages comprising:
    a housing having a floor and a rear housing support for an upper housing section, said first and second means for producing partially frozen beverages disposed adjacent to said upper housing section;
    first and second torque transmission means mounted on said floor;
    a geared motor having an output shaft directly connected to said first torque transmission means;
    said first torque transmission means including:
    a stand having three upright members which rotatably support first and second axially aligned shafts, said stand mounted on said floor;
    said first shaft having an axially outboard end directly connected to said output shaft of said geared motor, and having an axially inboard region rotatably supported by a first of said three upright members;

a coupler having axially separable sections, a respective coupler section attached to a corresponding opposing end of said first and second shafts;

said second shaft rotatably supported by a second and a third of said three upright members over a region remote from said coupler;

a drive wheel attached to said first shaft, an output wheel attached to said second shaft at a position intermediate said second and third upright members;

said second torque transmission means including:

a stand having four upright members which rotatably support first and second axially aligned shafts, said stand mounted on said floor;

a coupler having axially separable sections, a respective coupler section attached to a corresponding opposing end of said first and second shafts;

said first shaft rotatably supported by a first and a second of said four upright members over a region remote from said coupler;

said second shaft rotatably supported by a third and a fourth of said four upright members over a region remote from said coupler;

an input wheel attached to said first shaft intermediate said first and second upright members;

a thrust bearing means mounted on said first shaft for preventing axially outboard movement of said input wheel and said first shaft;

an output wheel attached to said second shaft at a position intermediate said third and fourth upright members;

said system including:

means for conveying torque between said drive wheel and said input wheel; and respective first and second vertical drive mechanisms correspondingly connected between said output wheels of said first and second torque transmission means and respective ones of said first and second means for producing said partially frozen beverages, for conveying torque therebetween.

2. A system for delivering torque as claimed in claim 1 wherein said first and second torque transmission means each include a means for biasing said coupler section attached to said second shaft toward the opposing coupler section.

3. A system for delivering torque as claimed in claim 2 wherein each said coupler section includes interlocking teeth having complementary tooth surfaces that slide over each other thereby causing said coupler to axially expand, said means for biasing forcing said coupler sections together an acting against an opposing torque developed by said means for producing said partially frozen beverage that causes said coupling to axially expand.

4. A system for delivering torque as claimed in claim 3 wherein the direct drive connection between said first shaft and said geared motor acts as a means for preventing axially outboard movement of said first shaft and opposes the force of said means for biasing, and wherein said thrust bearing means of said second torque transmission means acts against the force of said means for biasing.

5. A system for delivering torque as claimed in claim 4 wherein said drive wheel of said first torque transmission means is coplanar with said input wheel of said second torque transmission means due to the positioning of the first torque transmission stand with respect to the second torque transmission stand on said floor.

6. A system for delivering torque as claimed in claim 5 wherein each said stand includes a respective base which is mounted to said floor, the first torque transmission base having an attachment passage through which passes means for mounting to said floor, the second torque transmission base having a pair of slots therethrough that are normal to the axially aligned first and second shafts and having a respective mounting means, for each slot of said pair, for mounting said second torque transmission base to said floor thereby enabling the regulation of tension on said means that conveys torque between said drive wheel and said input wheel.

7. A system for delivering torque as claimed in claim 6 wherein each said means for producing includes a power input wheel near an upper portion of said rear housing support, and each said vertical drive mechanism includes a continuous belt connected to said output wheel and said power input wheel, each said vertical drive mechanism also includes an idler wheel means for establishing the degree of tension on said continuous belt, said idler wheel means adjustably mounted on said rear housing support.

8. A system for delivering torque as claimed in claim 4 wherein the thrust bearing means of said second torque transmission means is a first thrust bearing having opposite, axial end surfaces respectively contacting an inboard side of the first upright member of said second torque transmission means and an axially outboard surface of said input wheel.

9. A system for delivering torque as claimed in claim 8 wherein said second transmission means includes a second thrust bearing mounted on said second shaft thereof at a position that limits the axially outboard movement of said second shaft, due to an axial expansion of said coupler, to a distance less than a total axial expansion distance of said coupler.

10. A system for delivering torque as claimed in claim 9 wherein said second thrust bearing of said second torque transmission means is further attached to an axially outboard end surface of said output wheel of said second torque transmission means.

11. A system for delivering torque as claimed in claim 10 wherein said first torque transmission means includes a thrust bearing mounted on said second shaft thereof at a position that limits the axially outboard movement of said second shaft, due to an axial expansion of said coupler, to a distance less than a total axial expansion distance of said coupler.

12. A system for delivering torque as claimed in claim 11 wherein said thrust bearing of said first torque transmission means is further attached to an axially outboard end surface of said output wheel.

13. A system for delivering torque to means for producing a partially frozen beverage comprising:

a housing having a floor and a rear housing support for an upper housing section, said means for producing a partially frozen beverage disposed adjacent to said upper housing section;

a torque transmission means mounted on said floor;

a geared motor having an output shaft directly connected to said torque transmission means;

the torque transmission means including:

a stand having three upright members which rotatably support first and second axially aligned shafts, said stand mounted on said floor;

said first shaft having an axially outboard end directly connected to said output shaft of said geared motor and having an axially inboard region rotatably supported by a first of said three upright members;

a coupler having axially separable sections, a respective coupler section attached to a corresponding opposing end of said first and second shafts, said coupler causing, during axially expansion thereof, said second shaft to move axially outboard away from said first shaft;

means for biasing the coupler section attached to said second shaft towards the opposing coupler section;

said second shaft rotatably supported by a second and a third of said three upright members over a region remote from said first coupler;

an output wheel attached to said second shaft at a position intermediate said second and third upright members;

a thrust bearing mounted on said second shaft at a position that limits the axially outboard movement of said second shaft to a distance less than a total axial expansion distance of said coupler;

said system including:

a vertical drive mechanism connected between said output wheel and said means for producing said partially frozen beverage.

14. A system for delivering torque as claimed in claim 13 wherein said three upright members rotatably support said first and second shafts via three bushings.

15. A system for delivering torque a claimed in claim 14 wherein each said upright member includes a vertically oriented lubrication channel extending from a top surface thereof, through a hole in the respective bushing, to the corresponding first and second shafts rotatably supported by said respective bushing.

16. A system for delivering torque as claimed in claim 13 wherein said means for biasing includes a spring having one end rotatably coupled to an axially inboard end surface of said second upright member and having the other end coupled to the attached couple section.

17. A system for delivering torque as claimed in claim 16 wherein said means for biasing includes a first spring stop attached to said second shaft adjacent to said attached coupler section and attached to said other end of said spring, a second spring stop radially spaced from said second shaft and retaining said one end of said spring, and includes a further thrust bearing spaced from said second shaft and having an axially inboard end surface abutting said second spring stop and an axially outboard end surface abutting said second upright member.

18. A system for delivering torque to means for producing a partially frozen beverage comprising:

a housing having a floor and a rear housing support for an upper housing section, said means for producing a partially frozen beverage disposed adjacent to said upper housing section;

a torque transmission means mounted on said floor;

a geared motor having an output shaft directly connected to said torque transmission means;

the torque transmission means including:

a stand having four upright members which rotatably support first and second axially aligned shafts, said stand mounted on said floor;

said first shaft rotatably supported by a first and a second of said four upright members;

an input wheel attached to said first shaft intermediate a first and a second of said four upright members, said input wheel coupled to a means for receiving torque from said geared motor;

a first thrust bearing mounted on said first shaft at a position that limits any axially outboard movement of said first shaft and input wheel;

a coupler having axially separable sections, a respective coupler section attached to a corresponding opposing end of said first and second shafts, said coupler causing said second shaft to move axially outboard when said coupler sections expand;

means for biasing the coupler section attached to said second shaft towards the opposing coupler section;

said second shaft rotatably supported by a second and a third of said three upright members over a region remote from said first coupler;

an output wheel attached to said second shaft at a position intermediate said third and fourth members;

a second thrust bearing mounted on said second shaft at a position that limits the axially outboard movement of said second shaft to a distance less than a total axial expansion distance of said coupler;

said system including:

a vertical drive mechanism connected between said output wheel and said means for producing said partially frozen beverage.

19. A system for delivering torque to a first and a second means for producing partially frozen beverages and for sensing opposing torques developed thereby comprising:

a housing having a floor and a rear housing support for an upper housing section, said first and second means for producing partially frozen beverages disposed adjacent to said upper housing section;

first and second torque transmission means mounted on said floor;

a geared motor having an output shaft directly connected to said first torque transmission means;

said first torque transmission means including:

a stand having three upright members which rotatably support first and second axially aligned shafts, said stand mounted on said floor;

said first shaft having an axially outboard end directly connected to said output shaft of said geared motor, and having an axially inboard region rotatably supported by a first of said three upright members;

a coupler having axially separable sections, a respective coupler section attached to a corresponding opposing end of said first and second shafts;

said second shaft rotatably supported by a second and a third of said three upright members over a region remote from said coupler;

a drive wheel attached to said first shaft, an output wheel attached to said second shaft at a position intermediate said second and third upright members;

said second torque transmission means including:

a stand having four upright members which rotatably support first and second axially aligned shafts, said stand mounted on said floor;

a coupler having axially separable sections, a respective coupler section attached to a corresponding opposing end of said first and second shafts;

said first shaft rotatably supported by a first and a second of said four upright members over a region remote from said coupler;

said second shaft rotatably supported by a third and a fourth of said four upright members over a region remote from said coupler;

an input wheel attached to said first shaft intermediate said first and second upright members;
a thrust bearing means mounted on said first shaft for preventing axially outboard movement of said input wheel and said first shaft;
an output wheel attached to said second shaft at a position intermediate said third and fourth upright members;
said system including:
means for conveying torque between said drive wheel and said input wheel;
respective first and second vertical drive mechanisms, correspondingly connected between said output wheels of said first and second torque transmission means and respective ones of said first and second means for producing said partially frozen beverages, for conveying torque therebetween; and
first and second sensing means for generating respective signals indicating a degree of said opposing torque developed by said first and second means for producing said partially frozen beverages, said first sensing means connected to said coupler of said first torque transmission means and sensing the axial expansion of the respective coupler sections, and said second sensing means connected to said coupler of said second torque transmission means and sensing the axial expansion of the respective coupler sections.

20. A system as claimed in claim 19 wherein said first and second torque transmission means each include a means for biasing said coupler section attached to said second shaft toward the opposing coupler section; each coupler section includes interlocking teeth having complementary tooth surfaces that slide over each other thereby causing said coupler to axially expand, said means for biasing forcing said coupler sections together and acting against an opposing torque developed by said means for producing said partially frozen beverage that causes aid coupling to axially expand.

* * * * *